Figure 1:
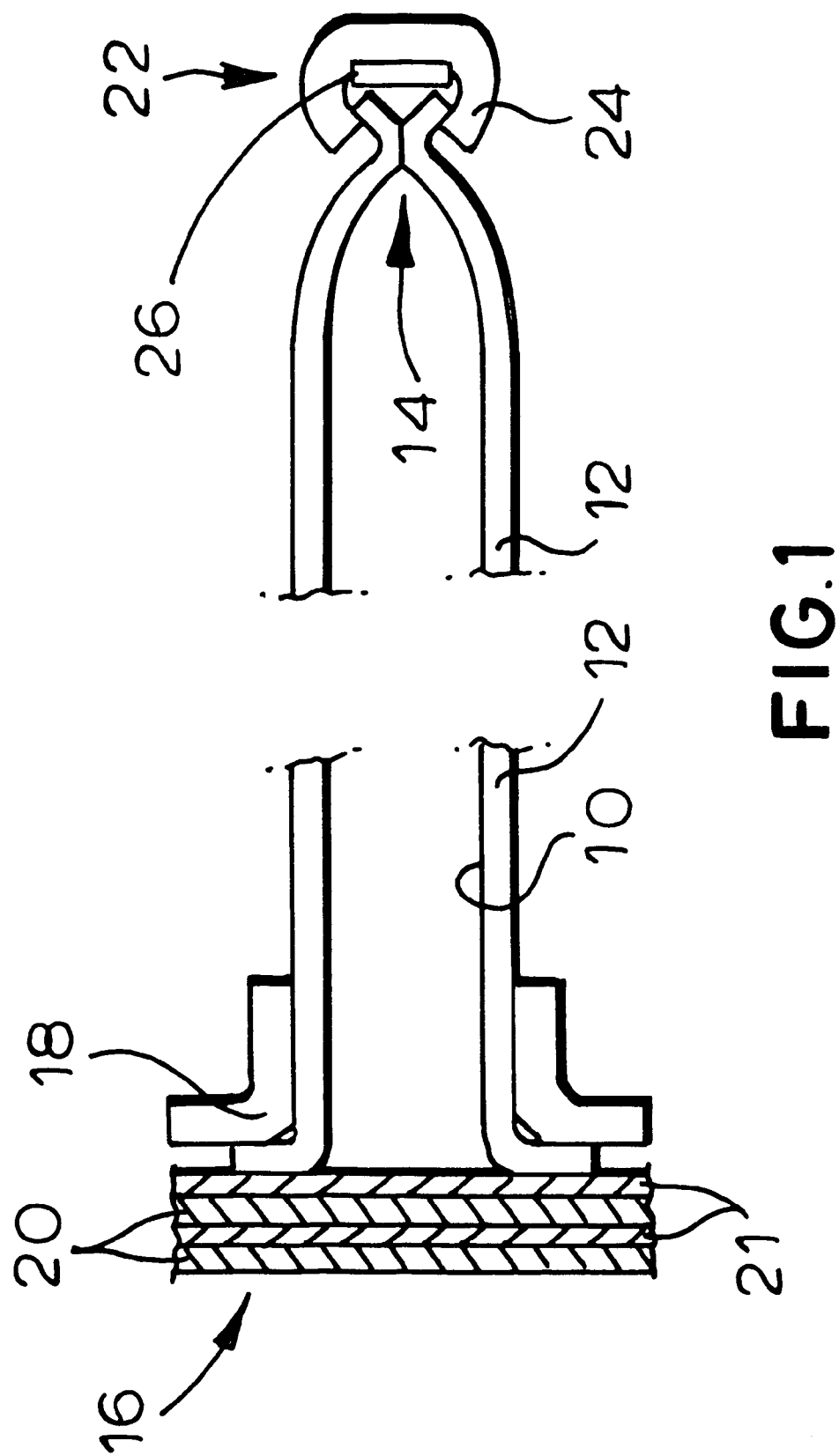

United States Patent [19]
Greatorex

[11] Patent Number: 5,899,786
[45] Date of Patent: May 4, 1999

[54] NON-WOVEN FIBRE FABRIC AND METHOD OF MAKING THE FABRIC

[75] Inventor: Anthony Thomas Greatorex, Syston, United Kingdom

[73] Assignee: Texon UK Limited, United Kingdom

[21] Appl. No.: 08/809,934

[22] PCT Filed: Oct. 3, 1995

[86] PCT No.: PCT/GB95/02337

§ 371 Date: Apr. 4, 1997

§ 102(e) Date: Apr. 4, 1997

[87] PCT Pub. No.: WO96/11293

PCT Pub. Date: Apr. 18, 1996

[30] Foreign Application Priority Data

Oct. 6, 1994 [GB] United Kingdom .................. 9420156

[51] Int. Cl.[6] ............................. B32B 7/00; B32B 27/34
[52] U.S. Cl. ........................... 442/411; 442/414; 442/415
[58] Field of Search .................................. 442/411, 414, 442/415; 55/374, 378, 381; 156/204, 308.4, 308.2

[56] References Cited

FOREIGN PATENT DOCUMENTS

| 0 337 597 A3 | 10/1989 | European Pat. Off. ......... D04H 1/06 |
| WO 96/04976 | 2/1996 | WIPO ............................. B01D 46/02 |

*Primary Examiner*—Marion E. McCamish
*Assistant Examiner*—Ula C. Ruddock

[57] ABSTRACT

Non-woven fiber fabrics are described, suitable for use in self-supporting dust filter units having at least one passage (10) defined by wall portions (12) made from air permeable fiber fabric through which wall portions (12) air can pass a d be drawn off along the passage (10) but which prevent the passage therethrough of dust and/or other debris carried by the air. The non-woven fabrics are blends of high temperature resistant fibers. A preferred blend consists of 50% by weight polyimide fibers and 50% by weight aramid fibers, but may include glass fibers, polytetrafuoroethylene fibers, or others and may optionally include an amount of heat activated fibers having a relatively high melting point for example, polyphenylene sulphide fibers.

11 Claims, 1 Drawing Sheet

NON-WOVEN FIBRE FABRIC AND METHOD OF MAKING THE FABRIC

This invention is concerned with non-woven fibre fabric and a method of making the same, and is especially concerned with non-woven fibre fabrics suitable for use in self-supporting filter units for filtering a fluid, for example air.

Our co-pending European Patent Applications Nos. EP 0,515,045-A1 and EP 0,549,105-A1, respectively U.S. Pat. No. 5,246,474 and U.S. Pat. No. 5,296,065; are both concerned with such filter units. Each filter unit having at least one passage, and preferably a plurality of passages, defined by fluid perm able wall portions of non-woven fibre fabric, through which the fluid to be filtered can pass and be drawn off along the passage or passages but which prevent the passage of particulate material and/or other debris carried by the fluid. The two European patent applications referred to above describe self-supporting units which are particularly suitable for filtering air in dust filters but may be used for filtering other fluid materials. Our co-pending UK Patent Application No. 9416052.0, filed on Aug. 9, 1994 is also concerned with self-supporting filter units.

In our co-pending patent applications, there are described examples of filter units capable of operating at a relatively high continuous temperature of, for example up to 260° C. and maximum temperatures of up to 300° C. for a temporary period. Such high temperature filter units have utilised a non-woven fibre fabric consisting of staple polyimide fibres to provide wall portions of filter units, through which the air to be filtered passes. In the manufacture of these filter units, the polyimide fibre fabric is heated to a temperature in the region of the glass transition temperature of the fibre which causes the fibres to shrink and become relatively rigid, after the fabric has been allowed to cool. This rigidity ensures that the wall portions of the filter units are relatively rigid and thus, self-supporting when the filter units are held by mounting portion at one end of the unit with the filtration passages extending horizontally, or substantially so.

In the manufacture of the fabric of polyimide fibres, known techniques for producing non-woven fibre fabric from staple fires are used including needling techniques to consolidate the fibres and to entangle the fibres to some extend to provide some strength to the fabric.

Whilst the filtration fabrics made of polyimide staple fibres have been found to perform very satisfactorily at high temperatures, very careful control of the temperature to which the fabric is heated during manufacture of the filter units is required.

In EP 0337597 (Albany Research (UK) Ltd.) there is described polyimide material which is consolidated by shrinkage to provide a structural material. This structural material makes use of the non-uniformity between shrinkage fibre and stable fibres in the material before consolidation on in order to provide reinforcing pillars within the material. Such non-uniformity is unacceptable in a filter material where pore size must be predictable in order to grade the filter.

This is because it has been found that if the fabric is heated to too high a temperature, the shrinkage of the fibres can be so great that the fabric tends to tear; furthermore, excessive shrinkage tends to emphasise any non-uniformity in the fibre mat which may arise, for example at he point where needles have penetrated the fabric during manufacture; and non-uniformities which are emphasised tend to detract from the otherwise relatively smooth surface and provide a surface which is somewhat lumpy in appearance. This is especially undesirable for self-cleaning air filters where it is desirable that the surface of the filtration fabric should be as smooth as possible to ensure ready release of dust when cleaning the filter. On the other hand, restricting the temperature to which fabric is heated during manufacture of the filter units tends to result in units which are less rigid than would be the case were a higher manufacturing temperature to be used and having somewhat lower strength.

It has now been found, surprisingly, that the use of a non-woven fibre fabric comprising a blend of polyimide fibres as a first component with a second component consisting of fibres which are generally dimensionally stable, th t is do not shrink or soften, or melt at temperatures to which the fabric is normally exposed in manufacture, enables the fabric to be heated to a somewhat higher temperature to provide increased rigidity and strength whilst militating against tearing of the fabric and providing a smoother surface to the filtration units.

References made herein to fibres which are dimensionally stable or fibres which do not shrink are to be understood as denoting fibres in which no substantial shrinkage, for example less than 5% shrinkage and preferably less than 1% shrinkage, occurs at temperatures to which the fibres are heated. In addition, dimensionally stable fibres do not expand significantly at these temperatures.

It has also been found that increased rigidity of a filtration fabric comprising polyimide fibre can be achieved by utilising a blend of polyimide fibre as a first fibre component and a second fibre component which melts at a temperature above 270° C. but below the glass transition temperature of the polyimide fibre, for example, polyphenyle sulphide fibres. It has been found that using blends of polyimide fibres and polyphenylene sulphide fibres the temperature to which the fabric must be heated in manufacture of filter units to achieve a certain rigidity is less than the temperature required to provide the same rigidity in a fabric consisting of only polyimide fibres provided that the temperature to which the fabric is heated during manufacture is sufficient to soften the polyphenylene sulphide fibres. The tendency to tear appears to be significantly reduced and the surface of the filter fabric is relatively smooth.

In some cases, satisfactory filter units may be made by using, instead of polyimide fibres, other first fibre components blended with a polyphenylene sulphide second fibre component, for example, first fibre components may include aramid, glass, polyetheretherketone (PEEK), or polytetrafluoroethylene fibres which are dimensionally stable and do not change phase at temperature between 300° C. and room temperature. However, with these other first fibre components, there is little or no shrinkage of the first fiber components when heated to soften and melt the polyphenylene sulphide component, so the contribution to rigidity made by the shrinkage of the polyimide fibre is not present in these cases. The particular first fibre components to be used are selected according to the ambient conditions, for example temperature, acidity, alkalinity, to which they are expected to be exposed in use so that the fabric is not adversely affected to any substantial extent.

In our aforementioned European Patent Application No EP 0,549,105-A1 and the aforementioned UK patent application a mounting portion of a filter unit is provided by a flange which is formed integral with the wall portions of the filter unit with reinforcing portions of material secured to outwardly flanged parts of the walled portions. Because of the shrinkage of polyimide fibres at manufacturing temperatures of the filter units, it is difficult to control the shrinkage of the reinforcing portions if polyimide fibres are used in the reinforcing layers and securing polyimide reinforcing layers to the body of a filter unit can be difficult.

Accordingly, the reinforcing portion may suitably comprise a non-woven fibre fabric comprising a blend of fibres consisting of a first fibre component which is dimensionally stable between room temperature and the temperature to which the filter unit is heated during manufacture or use and a second fibre component which softens and holds the first fibres in place after heating the fabric during manufacture of a filter unit and then allowing it to cool.

This invention may be considered to provide, in one aspect, a on-woven fibre fabric comprising a blend of polyimide fibres as a first component and a second component consisting of fibres which do not shrink or soften at temperatures to which the fabric is normally exposed in manufacture or in use.

Preferably in a fabric as set out in the last preceding paragraph the second component comprises aramid fibres; however, other fibres having the desired property may be used for example, glass, polyetheretherketone or polytetraflkoroethylene fibres or mixtures of any suitable fibres.

Conveniently, in a fabric as set out in the last preceding paragraph but one, the polyimide fibres are present in amounts of between 40% and 80% by weight based on the weight of the fabric.

If desired, a fabric as set out in the last preceding paragraph but two may also comprise a heat-activated component which may be introduced into the fibre from which the fabric is formed as a third fibre component, which softens under the influence of heat, the heat-activated component being present in an amount sufficient to hold the fibres of the fabric without substantially blocking passages between the fibres when heated to a temperature reached during the manufacture of filter units. Suitably the heat-activated component, for example polyphenylne sulphide, may be present in an amount of up to 40% by weight based on the weight of the fabric.

In a other aspect, the invention may be considered to provide a non-woven fibre fabric comprising a first fibre component which is dimensionally stable and does not melt between a temperature of 300° C. and room temperature and a second component which melts at a temperature above 270° C. but below the temperature at which the first fibre component eases to be dimensionally stable or melts.

Preferably, the first fibre component of a fabric as set out in the last preceding paragraph is polyimide, however, aramid, glass, polyetheretherketone or polytetrafluoroethylene, or blends of any of these fibres may also be used.

In a fabric as set out in the last preceding paragraph but one the second component is preferably polyphenylene sulphide which is suitably introduced into the fabric as a second fiber component; however, where the first fibre component consists of fibres, for example glass, having a sufficiently high melting point, the second component may be polyetheretherketone.

In a fabric in accordance with the last preceding paragraph but two the first fibre component is suitably present in an amount of between 50% and 90% by weight based on the weight of the fabric.

In yet another aspect, the invention may be considered to provide a method of making a non-woven fibre fabric comprising procuring a blend of first and second fibre components and forming the fibre blend into a non-woven fibre batt, and subjecting the batt to heat wherein the first fibre component consists of polyimide fibres and the heat to which the batt is subjected is sufficient to raise the temperature such that the polyimide fibres are caused to shrink but not sufficient to cause the fibres of the second component to shrink, expand, soften or degrade to any substantial extent.

In carrying out a method as set out in the last preceding paragraph, the temperature to which the batt is heated may be about the glass transition temperature of the first fibre component.

In carrying out a method as set out in the last preceding paragraph but one, the batt may also include a third fibre component, the third component being heat activable at the temperature to which the batt is heated, whereby to hold the first and second fibre components without substantially blocking the passages between the fibres.

In yet another aspect, the invention may be considered to provide method of making a non-woven fabric comprising procuring blend of first and second fibre components, forming the fibre blend into a non-woven fibre batt and subjecting the batt to heat, wherein the first fibre component is substantially dimensionally stable and does not melt between a temperature of 300° C. and room temperature and wherein the second fibre component softens at a temperature above 270° C. but below the temperature at which the first component ceases to be dimensionally stable or melts and wherein the batt is heated to a temperature between the softening temperature of the second component and the temperature at which the first component ceases to be dimensionally stable or melts, whereby to provide a fabric which is stable at temperatures up to the softening point of the second component.

A fabric in accordance with the invention is preferably made by a method in accordance with the invention.

In yet another aspect, the invention may be considered to provide a self-supporting filter unit having at least one passage defined by wall portions made from air-permeable fibre fabric, through which wall portions air can pass and be drawn off along the passage but which prevent the passage therethrough of dust and/or other debris carried by such air, in which the passage is closed off at one end portion and at the other end portion there is formed integral with said wall portions a rigid mounting portion into which the passage opens whereby the filter unit can be supported as part of a filter assembly wherein the air permeable fabric is a fabric in accordance with the invention.

There now follows a detailed description to be read with reference to the accompanying drawing of non-woven fibre fabrics and methods of making the same, together with a filter unit in which the fabrics are utilised, embodying the invention. It will be realised that these fabrics methods and filter unit have been selected for description to illustrate the invention by way of example only.

In the accompanying drawing, FIG. 1 is a diagrammatic sectional view of a self-supporting filter unit embodying the invention.

The illustrative filter unit is generally similar in construction to that described in our aforementioned copending European Patent Application No EP-0,515,045-A1 and is of detailed construction similar to that described in the above mentioned UK patent application.

The illustrative filter unit has a plurality of passages (10) defined by wall portions (12) made from air permeable non-woven fibre fabric through which wall portions (12) air can pass and be drawn off along the passages (10) but which prevent the passage therethrough of particulate material eg dust, and/or other debris carried by such air. The passages (10) are closed off at one end portion by securing together extremities (14) of the fabric. At the other, open end portion there is formed integral with the wall portions (12) a rigid mounting portion (generally designated 16) into which the passages (10) open whereby the illustrative filter unit can be supported as part of a filter assembly.

The mounting portion (16) comprises a first reinforcing portion (18) of non-woven fibre fabric material which extends around and is secured to the fabric of the wall portions (12), parts of the first reinforcing portion (18) and of the fabric of the wall portion being outwardly flanged the mounting portion further comprises a second reinforcing portion (20,21) of non-woven fibre fabric material positioned over the outwardly flanged portions, in alignment therewith, and secured thereto, the second reinforcing portion (20,21) having one or more apertures (not shown) therein. Adjacent said closed one end of the passages (10) a strengthening portion, (generally designated 22) is provided by forming parts of the wall portions, including the extremities (14).

This strengthening portion (22) comprises fabric of the wall portions (12) including the extremities (14) and a third reinforcing portion (24) which is wrapped around the extremities (14) of the wall portion and secured thereto by means of a bonding material (26). The second reinforcing portion (20, 21) comprises a first reinforcing layer (20) and a second layer (21) by which the first layer is bonded to the outwardly flanged portion but which may itself comprise an amount of reinforcing fibre as well as a bonding agent, if desired.

The illustrative filter unit is manufactured generally as described in our aforementioned UK patent application by a method which involves forming a fluid permeable fibre fabric to provide the walls portions (12) and forming the mounting portion (16) at the open end of the filter unit. Two layers of needled fibre batt are sewn to provide the general filter shape, including defining passages (10). The passages (10) have formers inserted into them with a shape corresponding to the cross-sectional shape to be imparted to the passages. Parts of the fabric of the wall portions (12) project and are outwardly flanged in carrying out the manufacturing process, after a strip of suitable fabric has been positioned around the wall portions. Fabric layers to provide the reinforcing portion (20,21) are appropriately positioned as are fabrics to provide the third reinforcing portion (24) and the bonding material (26). The whole is then subjected to heat and, if desired, pressure, to activate the various heat activatible components.

Various non-woven fibre fabrics which may provide filter units embodying the invention and which themselves embody the invention in its fabric aspects are described hereinafter in Examples I–IV, which also describe the treatment of a fibre batt to provide a filter unit of the type show in FIG. 1, using the manufacturing process outlined above and described in more detail in our co-pending patent application.

EXAMPLE I

A non-woven fibre batt is formed which comprises a blend of polyimide fibres and aramid fibres, the blend comprising 50% by weight of each type of fibre. The fibres are formed into a blend by known fibre blending technique and laid to form a non-woven fibre mat which is subjected to a needling operation, in generally known manner to consolidate the mat and provide a non-woven fibre batt.

The non-woven fibre batt is cut to provide appropriate pieces which are assembled and subjected to heat and pressure as described above to form a filter unit; care must, of course, be taken not to subject the wall portions to undue pressure, to avoid unwanted consolidation (which might block the passages between the fibres).

In Example I, the polyimide fibres are copolyimide fibres having a glass transition temperature of 315° C. supplied under the designation P84 by Lenzing AG. The aramid fibres are Nomex fibres. Nomex is heat resistant and has good dimensional stability at relatively high temperature. Nomex does not melt but degrades rapidly at temperatures above 370° C. It is suitable for use at continuous temperatures up to a above 260° C.

In the manufacture of filter units in accordance with the invention, the fibre batt consisting of the blend of polyimide and aramid fibres above, is subjected to heat sufficient to cause shrinkage of the polyimide fibres and to render them more rigid, the batt being heated to a temperature of the order of 300 ° C.; the mounting and strengthening portions (16,22) also are subjected to pressure to consolidate them sufficiently. The filter unit fabric so formed is found to be rigid and self-supporting when the unit is supported by its mounting portion (16) with the passages (10) extending in a horizontal direction. This illustrative fabric showed no tendency to tear during the manufacturing process, in comparison with previous experience with non-woven fabrics in which the fibres of the fabric of the wall portions (12) are only P84 polyimide fibres. Furthermore, the surfaces of the fabric appear to be somewhat smoother than fabrics made only of the P84 copolyimid, treated to the same temperature and are therefore expected to be more suitable for use in self-cleaning filter units. The fabric has an area weight of about 500 grams per square meter.

EXAMPLE II

A non-woven fibre batt is formed by known fibre blending and consolidating techniques including a needling operation sing a blend of three fibre components. The first fibre component is P84 copolyimide staple fibre referred to above present in amount of 50% by weight based on the weight of the fabric, the second fibre component is Nomex aramid fibre present in amount of 40% by weight of the fabric and the third component is a polyphenylene sulphide fibre supplied under the trade name Ryton. These polyphenylene sulphide fibres have a melting point of about 285° C. and are manufactured by Philips Fibers Corporation and available from them. In making a filter unit of the type shown in FIG. 1 from the fibre blend of Example II, the fibre batt must be subjected to a temperature in excess of 285° C. but below 300° C., in order to melt the Ryton fibres to heat activate them and to cause some shrinkage of the P84 fibre However, the temperature is not so high as the first example, thus the shrinkage of the P84 fibres is not too severe and there is an even smaller risk of the fabric tearing, together with improved surface finish. The presence of the Ryton fibres may lead to an even smoother surface to the finished fabric in the filter, thus improving the self-cleaning ability in the use of the filter.

EXAMPLE III

The fibre blend of the fabric described in this example also comprises first, second and third fibre components which are the same as those in Example II but present in different proportions, namely equal parts of each component. This third illustrative fabric also performs satisfactorily in the filter unit of the type described above, with good self-cleaning properties.

EXAMPLE IV

This is an example of a filter fabric which does not include any polyimide fibres and comprises a blend of 80% by weight Nomex aramid fibres, and 20% by weight Ryton fibres. The filter fabric so formed is found to perform satisfactorily as the wall portions (12) of the filter units as shown in FIG. 1 but the unit being intended to run at continuous temperatures somewhat lower than for Examples I, II and III.

Instead of the Ryton polyphenylene sulphide fibres used in the examples it may be possible to utilise Fortron polyphenyle sulphide fibres supplied by Hoechst Celanese Corporation of Charlotte, N.C., USA; Fortron fibres have a melting point of about 282° C. and low shrinkage of less than 1% when subjected to hot air at a temperature of 204° C. for one hour.

Instead of Nomex aramid fibres referred to, it may be possible to use Zyex polyetheretherketone supplied by Zyex Ltd of Stonedale Road, Oldends Lane Industrial Estate, Stonehouse, Gloucestershire GL10 3RQ. Zyex fibres have a melting point of about 335° C. and low shrinkage of about 1% at a temperature of 180° C. Zyex fibres have good resistance to chemical attack and exposure to steam.

In manufacturing the filter unit shown in FIG. 1 utilising the fabric described in Example I for the wall portion, the first reinforcing layers (20) and the first reinforcing portion (18) are suitable non-woven fibre fabrics having weight of 300 grams per square metre and comprising a blend of 66% by weight Nomex fibres and 34% by weight Ryton fibres. The second layers (21) and the bonding material (26) are non-woven fibre fabrics having a weight of 300 grams per square meter and consisting of a fibre blend ( of 80% by weight Ryton fibres and 20% by weight Nomex fibers and third reinforcing portion (24) is a non-woven fibre fabric consisting only of P84 polyimide fibres. However, it will be appreciated that many other blends of fibre materials may be used in the mounting portion (16) and strengthening portion (22) of filter units embodying the invention provided that the reinforcing characteristics are adequate and that the various layers are sufficiently securely bonded to one another, especially in the mounting portion, to effectively provide a mounting portion which is integral with the fabric of the wall portions (12).

It will be appreciated that the drawing of FIG. 1 is diagrammatic and that when the manufacture of the filter unit is finished, the strengthening portion (22) will have a substantially T configuration with the third reinforcing portion being entirely wrapped around the outwardly flared extremities (14) of the wall portions (12) and bonded thereto by the bonding material (26).

I claim:

1. A non-woven filter fibre fabric comprising a blend of polyimide fibres as a first component and a second component consisting of fibres which do not shrink or soften a temperatures to which the fabric is normally exposed in manufacture or in use, said second component being distributed through said fabric in order to provide a matrix upon which the fabric surface remains substantially uniform after shrinkage of said first component.

2. A fabric according to claim 1, wherein the second component comprises aramid fibres.

3. A fabric according to claim 1, wherein the polyimide fibres are present in an amount of between 40% and 80% by weight based on the weight of the fabric.

4. A fabric according to claim 1, further comprising a heat-activated component which softens under the influence of heat present in an amount sufficient to hold the fibres of the fabric without substantially blocking passages between fibres of the fabric.

5. A fabric according to claim 4, wherein the heat-activated activated component is present in an amount of up to 40% by weight based on the weight of the fabric.

6. A non-woven fibre fabric comprising a first fibre component which is dimensionally stable and does not melt between a temperature of 300° C. and room temperature and a second component which melts at a temperature above 270° C. but below the temperature at which the first fibre component ceases to be dimensionally stable or melts.

7. A fabric according to claim 6, wherein the first fibre component is selected from polyimide, aramid, glass, polyethertherketone and polytetrafluoroethylene, or blends thereof.

8. A fabric according to either claim 6, wherein the second component is polyphenylene sulphide.

9. A fabric according to claim 6, wherein the first fibre component is present in an amount of between 50% and 90% by weight based on the weight of the fabric.

10. A self-supporting filter unit having at least one passage defined by wall portions made from air-permeable fibre fabric, through which wall portions air can pass and be drawn off along the passage but which prevent the passage there-through of dust and/or other debris carried by such air, in which the passage is closed off at one end portion and at the other end portion there is formed integral with said wall portions a rigid mounting portion into which the passage opens whereby the filter unit can be supported as part of a filter assembly wherein the air-permeable fabric is a fabric comprising a blend of polyimide fibres as a first component and a second component comprising fibres which do not shrink or soften at temperatures to which the fabric is normally exposed in manufacture or in use, said second component being distributed through said fabric in order to provide a matrix upon which the fabric surface remains substantially uniform after shrinkage of said component.

11. The self-supporting filter element according to claim 10, wherein said first fibre component is dimensionally stable and does not melt between a temperature of 300° C. and room temperature and said second component melts at a temperature above 270° C. but below the temperature at which said first fibre component ceases to be dimensionally stable or melts.

* * * * *